United States Patent
Park

(10) Patent No.: US 10,692,649 B2
(45) Date of Patent: Jun. 23, 2020

(54) METHOD AND APPARATUS FOR REDUCING NOISE GENERATED BY RECTIFICATION DIODE LOCATED AT PRIMARY SIDE OF SWITCHING POWER SUPPLY

(71) Applicant: Chan Woong Park, Yongin-si (KR)

(72) Inventor: Chan Woong Park, Yongin-si (KR)

( * ) Notice: Subject to any disclaimer, the term of this patent is extended or adjusted under 35 U.S.C. 154(b) by 0 days.

(21) Appl. No.: 16/083,892

(22) PCT Filed: Mar. 16, 2017

(86) PCT No.: PCT/KR2017/002841
§ 371 (c)(1),
(2) Date: Sep. 11, 2018

(87) PCT Pub. No.: WO2017/160098
PCT Pub. Date: Sep. 21, 2017

(65) Prior Publication Data
US 2019/0074132 A1    Mar. 7, 2019

(30) Foreign Application Priority Data

Mar. 17, 2016   (KR) .................. 10-2016-0032274
Apr. 1, 2016    (KR) .................. 10-2016-0040079

(51) Int. Cl.
*H01F 27/36*     (2006.01)
*H02M 1/44*      (2007.01)
(Continued)

(52) U.S. Cl.
CPC ........... *H01F 27/362* (2013.01); *H01F 27/36* (2013.01); *H01F 27/365* (2013.01); *H02M 1/44* (2013.01);
(Continued)

(58) Field of Classification Search
CPC ...................................................... H02M 1/44
See application file for complete search history.

(56) References Cited

U.S. PATENT DOCUMENTS 6,061,252 A      5/2000  Hosotani
2002/0034084 A1* 3/2002  Kogel .................. H02M 3/335
                                                    363/20
(Continued)

FOREIGN PATENT DOCUMENTS

CN    1272898 C      8/2006
JP    11-187664 A    7/1999
(Continued)

OTHER PUBLICATIONS

International Search Report for PCT/KR2017/002841 dated Jun. 9, 2017 from Korean Intellectual Property Office.

*Primary Examiner* — Jue Zhang
*Assistant Examiner* — Trinh Q Dang
(74) *Attorney, Agent, or Firm* — Revolution IP, PLLC

(57) ABSTRACT

A switching power supply device which includes an input filter capacitor and a switching device, includes: a transformer comprising a core of the transformer and a first input winding, the first input winding being wound around the core of the transformer, connected between one terminal of the input filter capacitor and one terminal of the switching device; a first capacitive unit connected between both terminals of the first attenuation winding part of the transformer, and including at least one device including a first capacitor; and a clamp unit configured to limit a peak voltage generated by the first input winding when the switching device is turned off during the switching operation of the switching device, the clamp unit including a rectification diode.

15 Claims, 12 Drawing Sheets

(51) Int. Cl.
*H02M 3/28* (2006.01)
*H02M 5/10* (2006.01)
*H02M 3/335* (2006.01)
*H02M 1/34* (2007.01)

(52) U.S. Cl.
CPC ............ *H02M 3/28* (2013.01); *H02M 3/335* (2013.01); *H02M 5/10* (2013.01); *H02M 2001/348* (2013.01)

(56) References Cited

U.S. PATENT DOCUMENTS

| | | | |
|---|---|---|---|
| 2006/0227576 | A1 | 10/2006 | Yasumura |
| 2009/0316439 | A1 | 12/2009 | Utsuno et al. |
| 2011/0080757 | A1 | 4/2011 | Young |
| 2012/0014145 | A1* | 1/2012 | Koike ................... H02M 1/36 363/49 |
| 2014/0153292 | A1 | 6/2014 | Yan et al. |
| 2016/0064137 | A1* | 3/2016 | Perez ................. H01F 27/2823 336/90 |
| 2016/0181929 | A1* | 6/2016 | Chen ................. H02M 3/33507 363/21.18 |

FOREIGN PATENT DOCUMENTS

| | | |
|---|---|---|
| JP | 2003-134818 A | 5/2003 |
| JP | 2006-296054 A | 10/2006 |
| JP | 2010-004633 A | 1/2010 |
| JP | 2010-016917 A | 1/2010 |
| JP | 2012-023832 A | 2/2012 |
| JP | 2013-544067 A | 12/2013 |
| JP | 2015-122933 A | 7/2015 |
| WO | 2009-034180 A1 | 3/2009 |

* cited by examiner

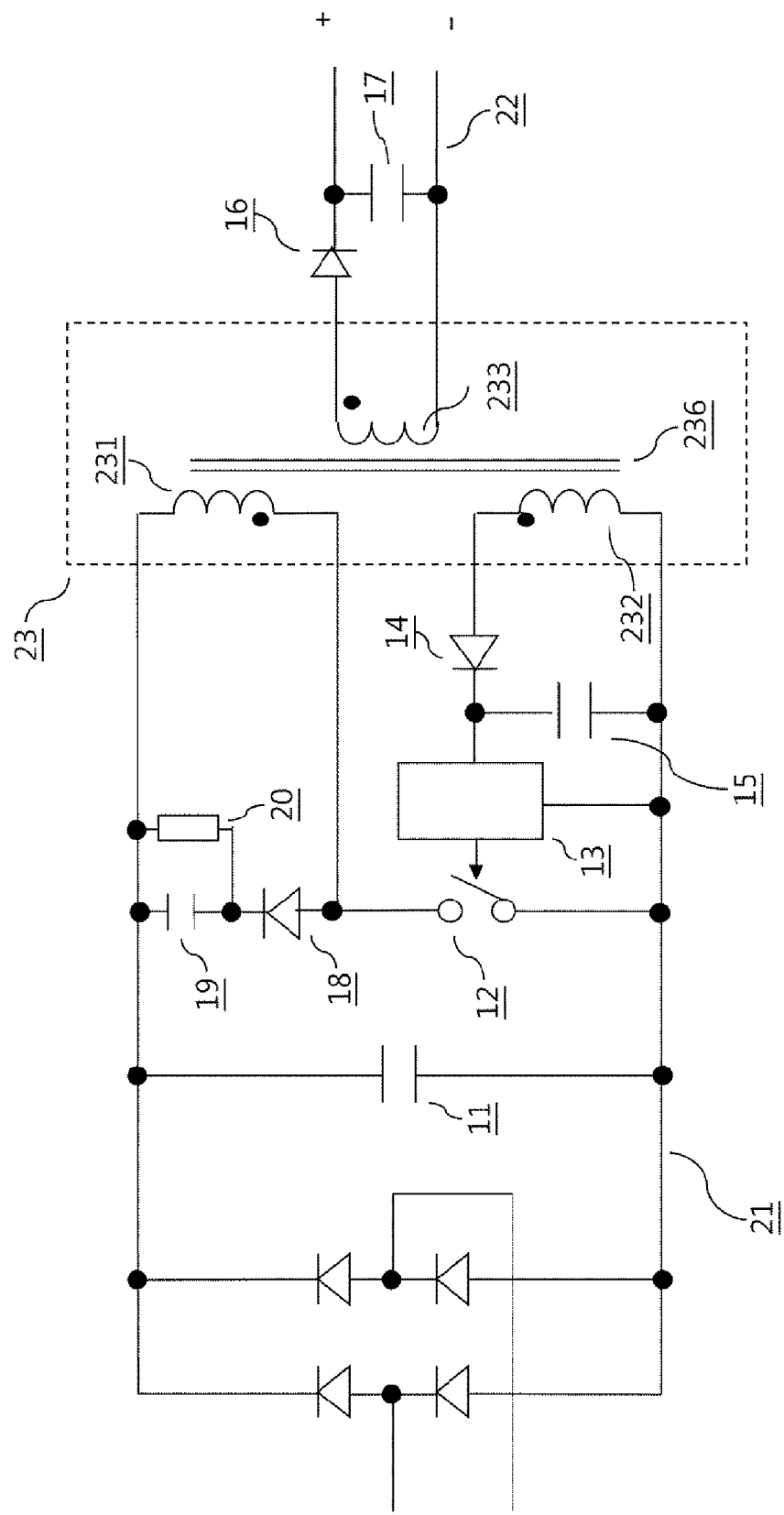
[FIG. 1]

[FIG. 2]
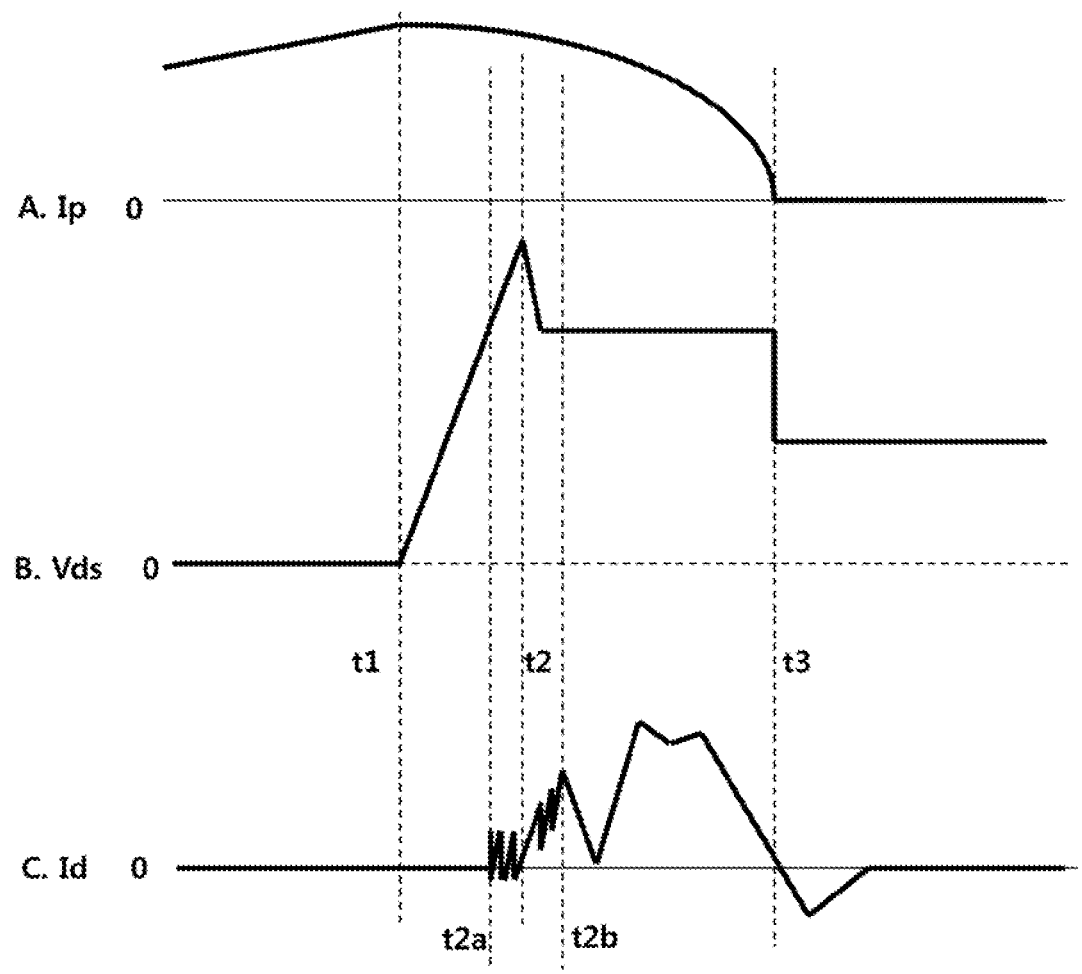

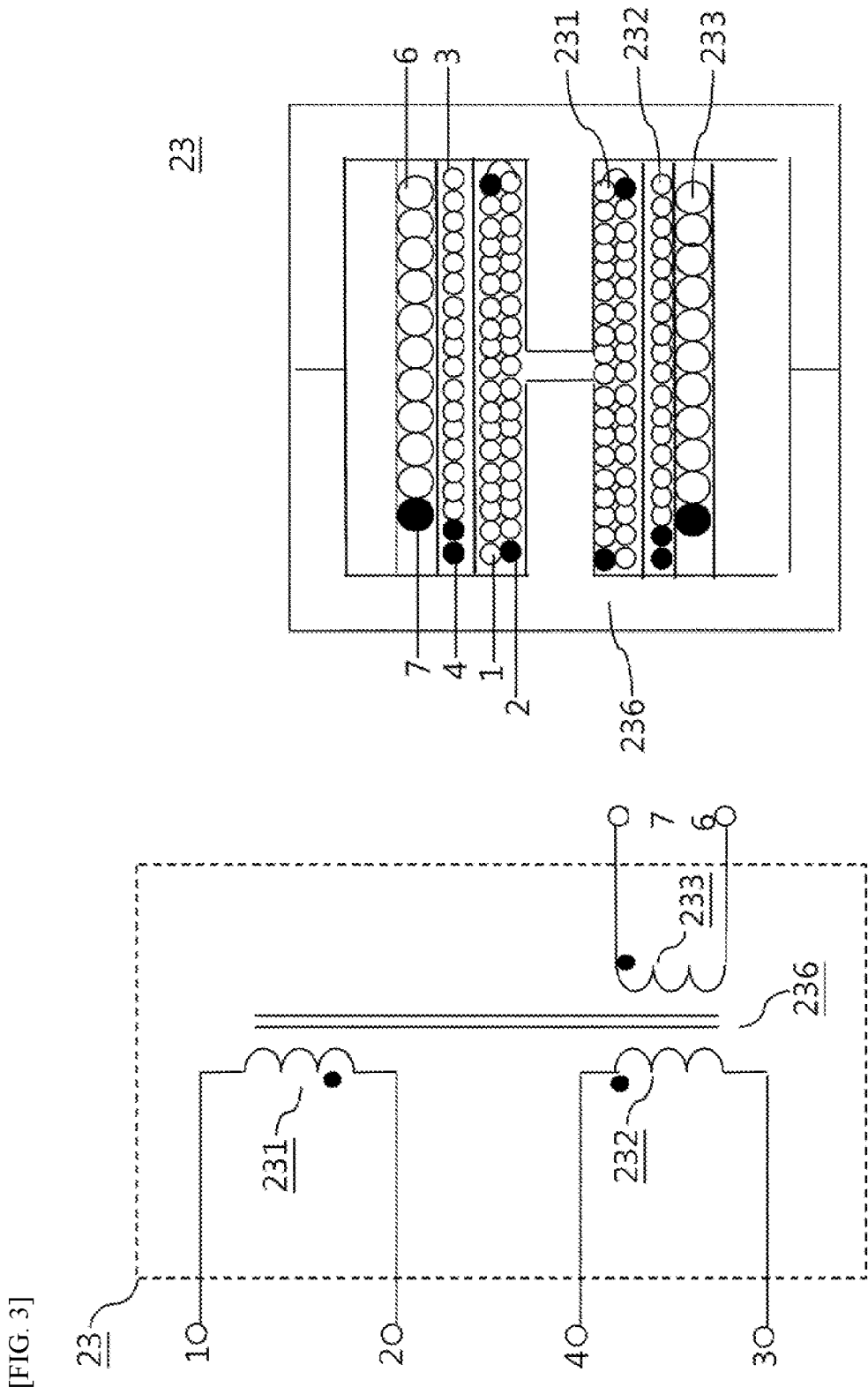

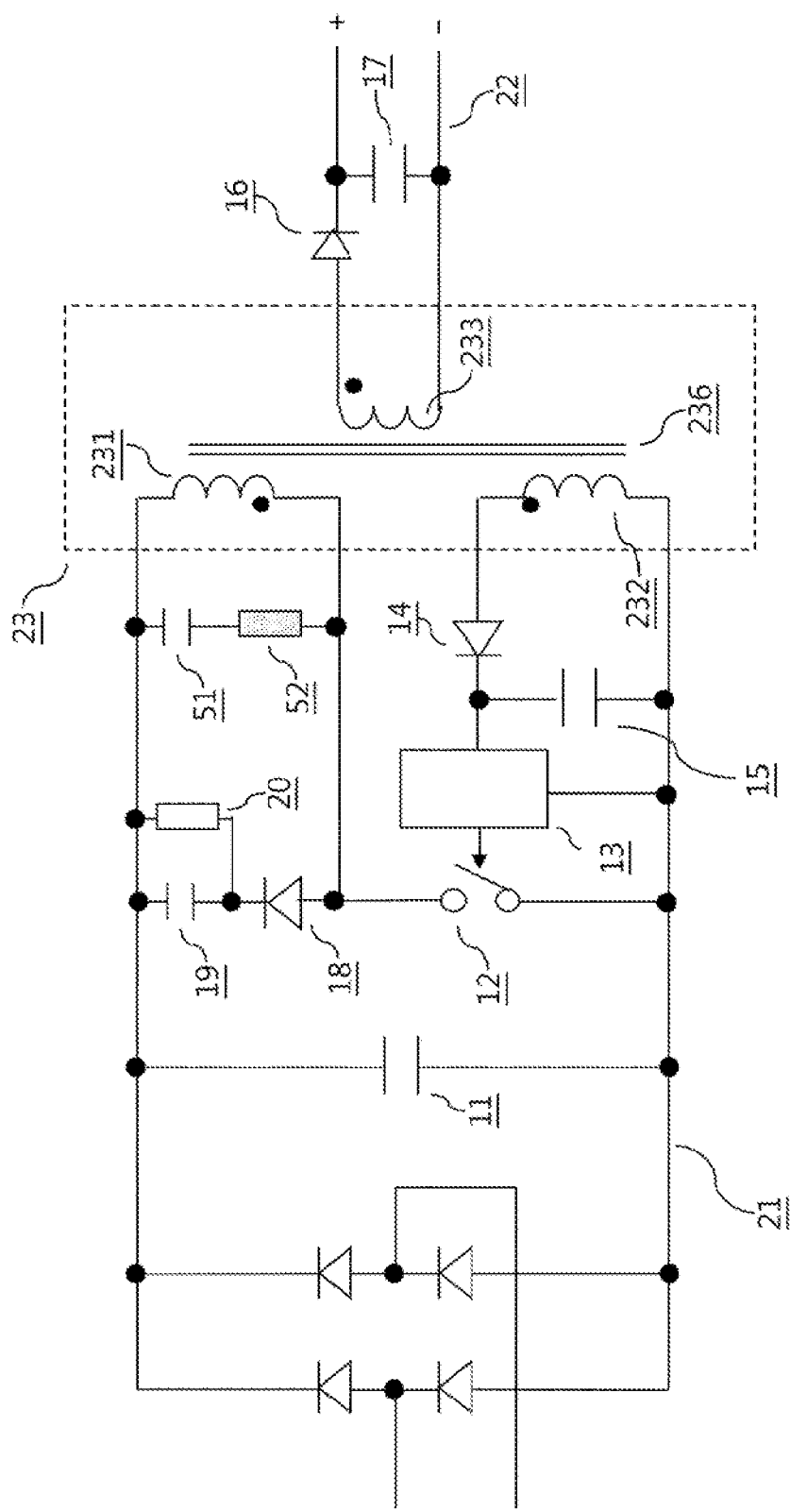
[FIG. 4]

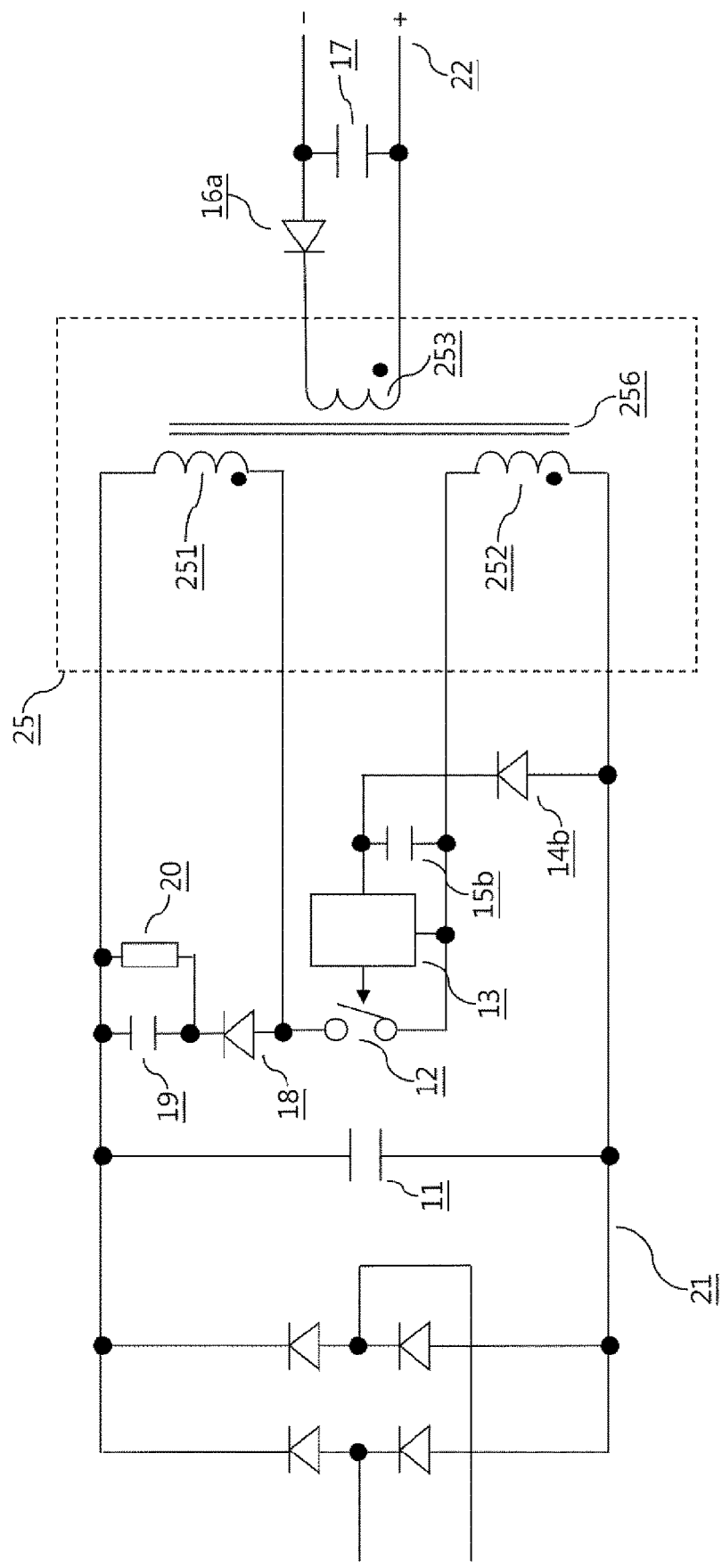
[FIG. 5]

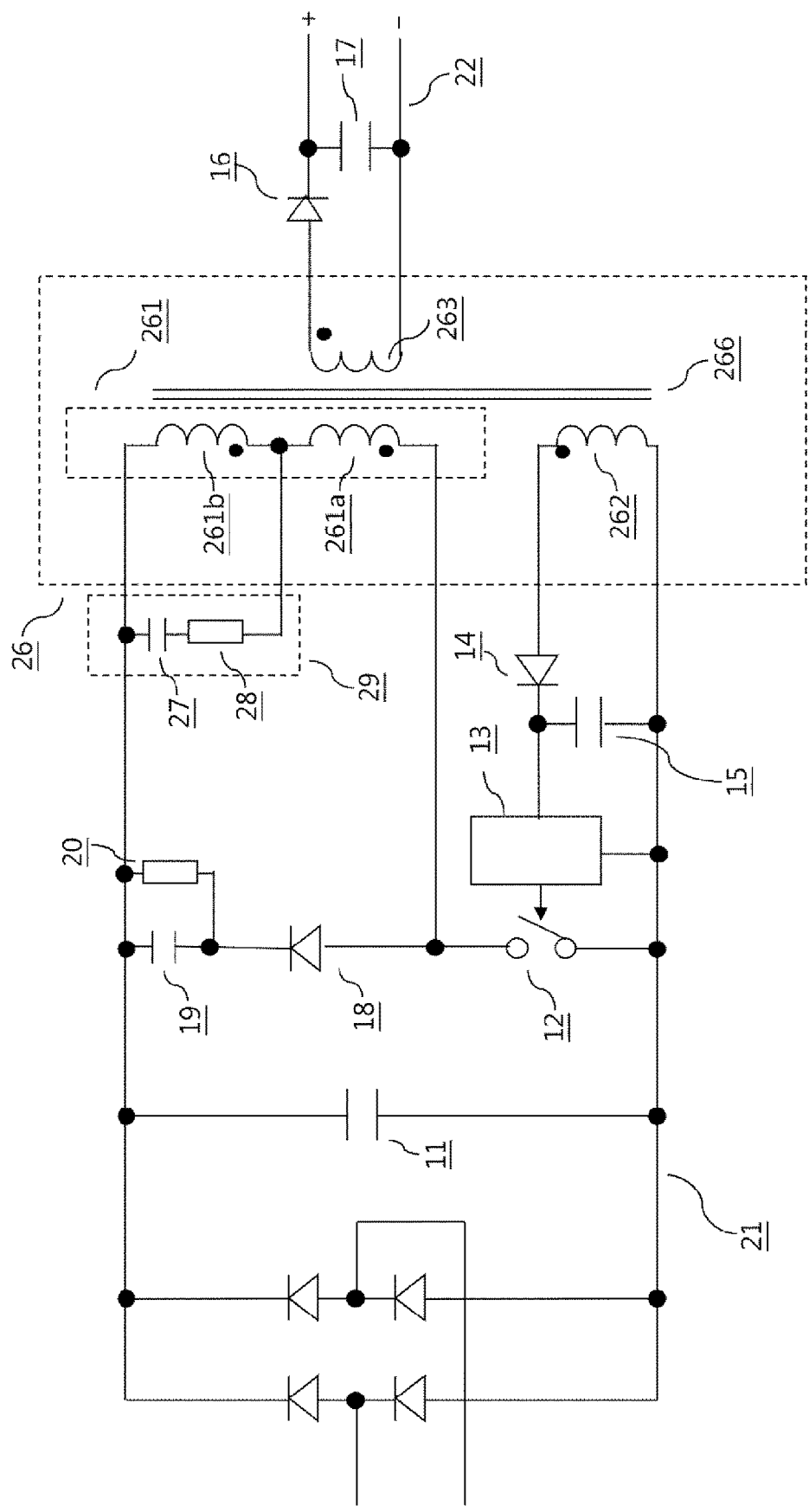
[FIG. 6]

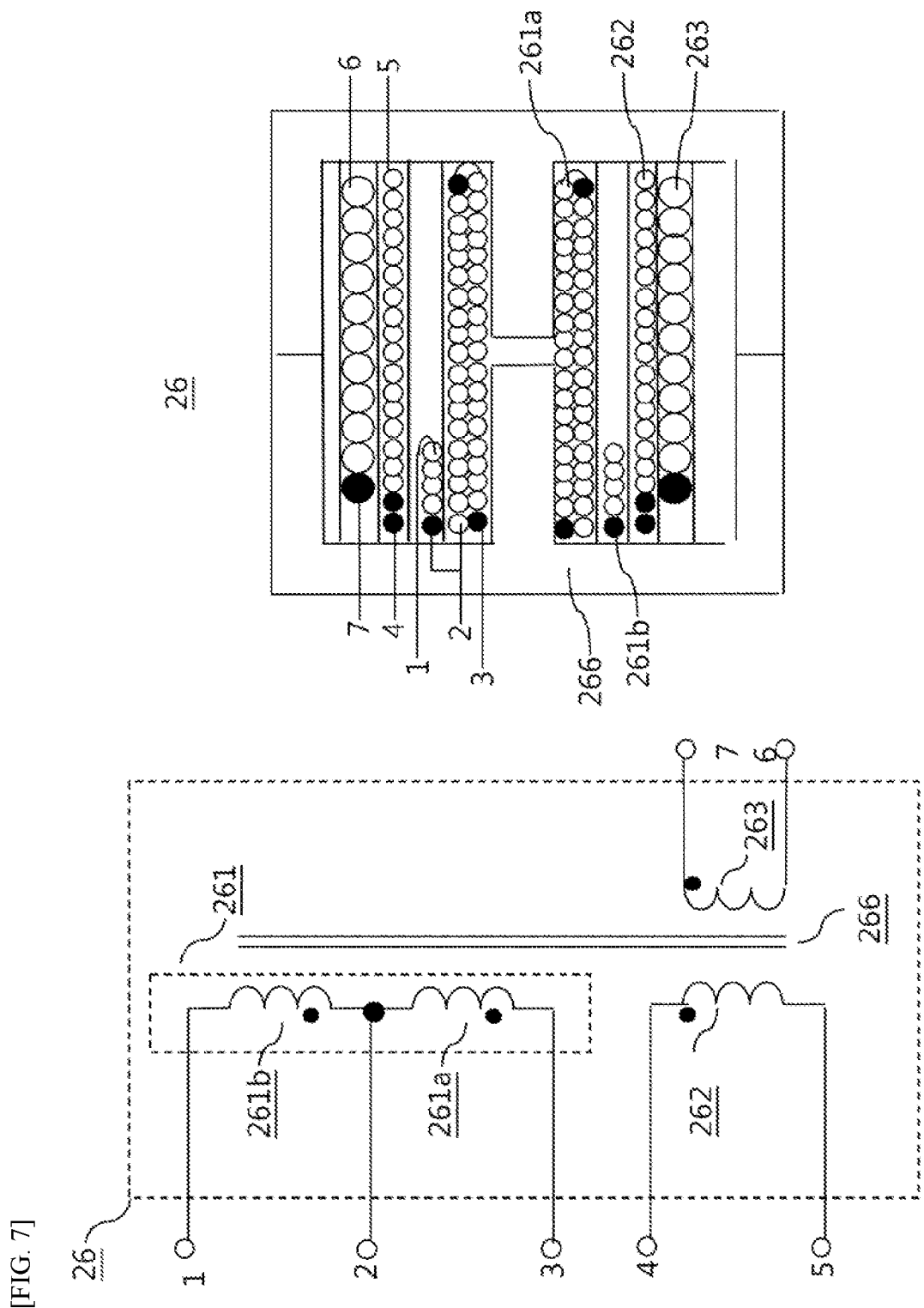
[FIG. 7]

[FIG. 8]
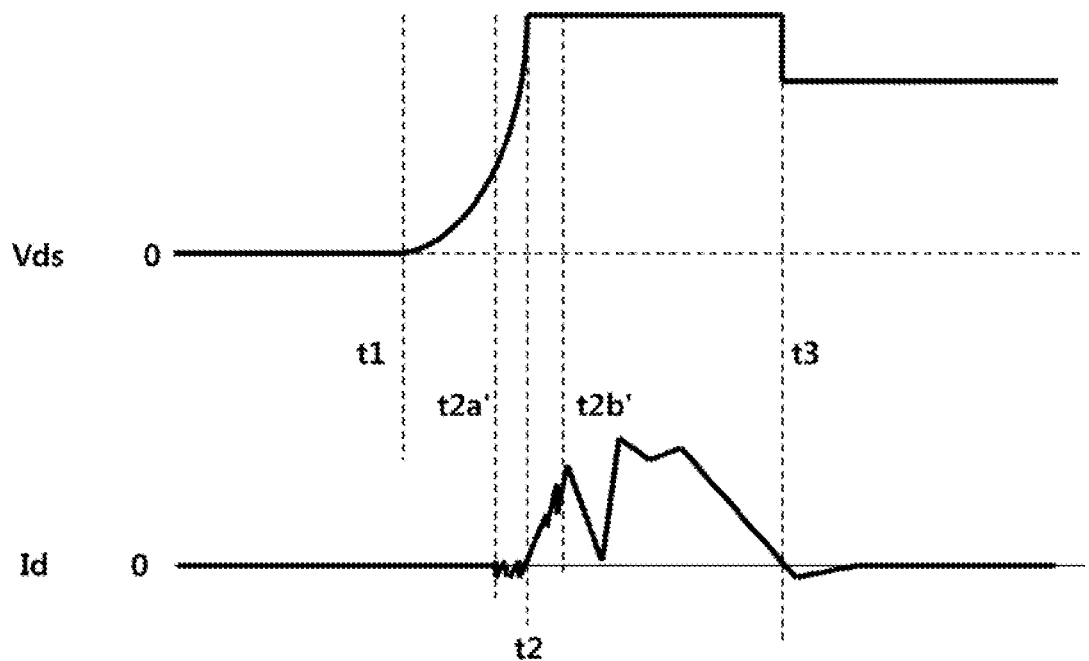

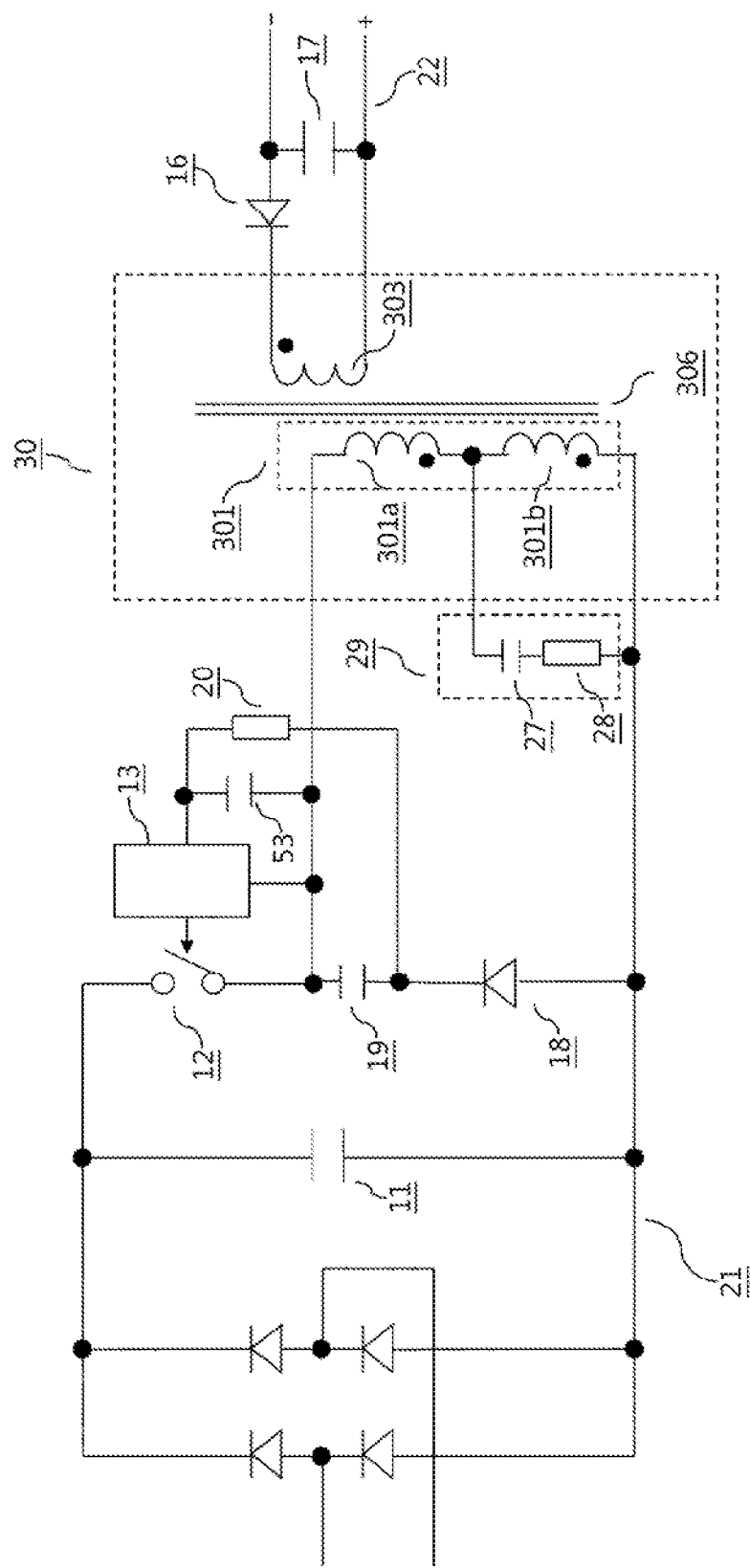
[FIG. 9]

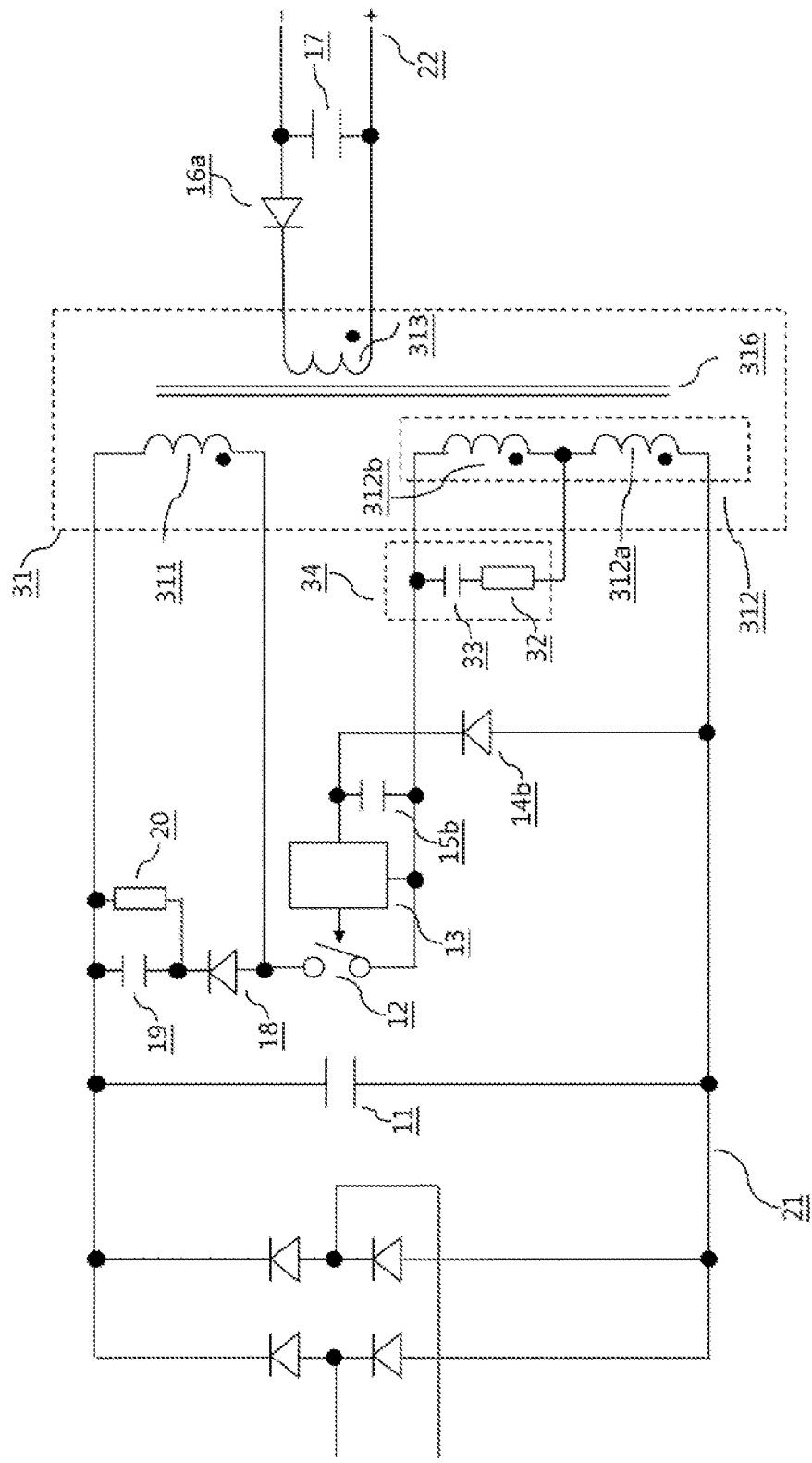
[FIG. 10]

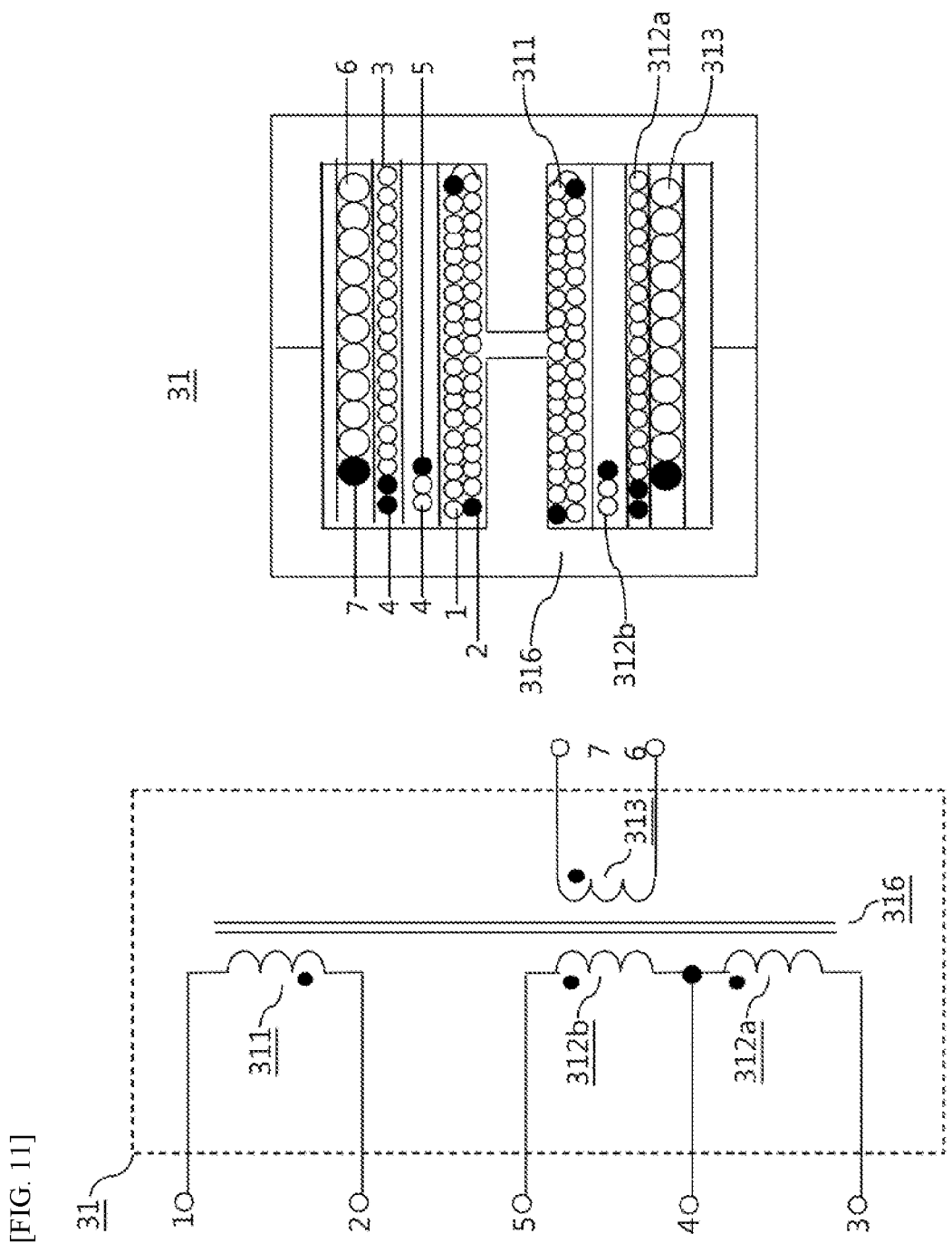

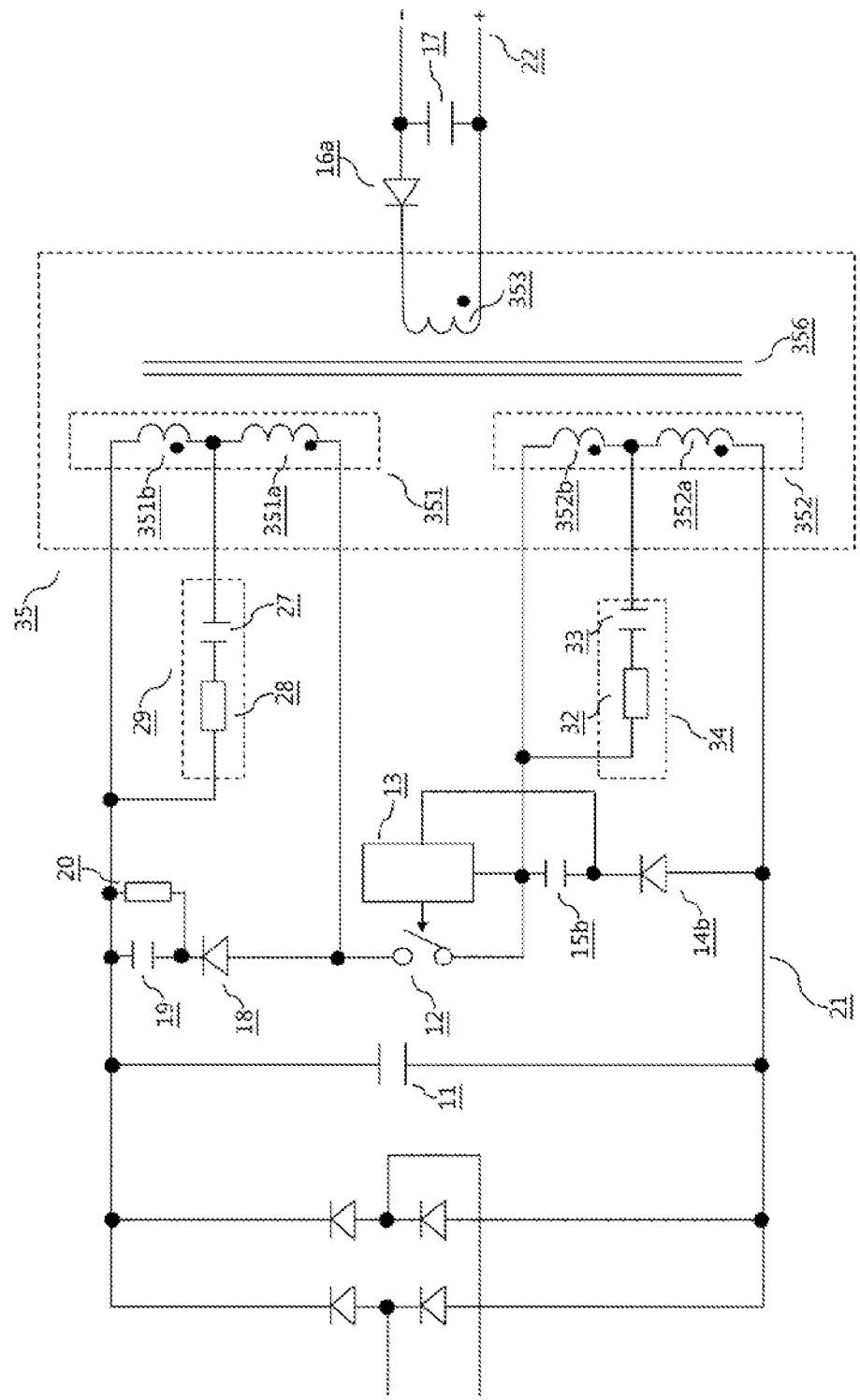
[FIG. 12]

METHOD AND APPARATUS FOR REDUCING NOISE GENERATED BY RECTIFICATION DIODE LOCATED AT PRIMARY SIDE OF SWITCHING POWER SUPPLY

TECHNICAL FIELD

The present invention relates to a switching power supply device and, more particularly, to a method and apparatus for reducing electromagnetic interference (EMI) of a power supply device by reducing noise generated by a rectification diode located at a primary side of a switching power supply.

BACKGROUND ART

In a general switching power supply device, when a spike voltage generated by an input winding of a transformer is clamped, a large high-frequency noise generated by a diode included in a clamp circuit affects outside of a power supply device through an input line or through an output line via other windings of the transformer.

Similarly, the large high-frequency noise is generated by a rectification diode used to rectify auxiliary power of the switching power supply device when a flyback voltage is rectified, and affects outside of the power supply device through the input line or through the output line via other windings of the transformer.

The related art will be briefly described below.

FIG. 1 is a circuit diagram of a flyback converter according to the related art. FIG. 2 is a waveform diagram of voltage and currents of components illustrated in FIG. 1.

In FIG. 1, an alternating current (AC) input voltage is rectified and smoothened by a capacitor 11. Through a switching operation of a switching device 12 controlled by a control unit 13, energy transferred from an input winding 231 of a transformer 23 to an output winding 233 thereof is rectified by a diode 16 and smoothened by a capacitor 17 to supply power to output. When the switching device 12 is switched, energy accumulated in a leakage inductance of the input winding 231, which is not coupled to an output winding 233 of the transformer 23, is not delivered to output but is discharged while charging a junction capacitance of the switching device 12, a distributed capacitance of the input winding 231, etc., thereby generating a high spike voltage. To protect the switching device 12, the magnitude of the spike voltage generated by the input winding 231 is limited by a clamp circuit including a diode 18, a capacitor 19, a resistor 20, etc. In FIG. 1, reference numeral 14 represents a diode, reference numeral 15 represents a capacitor, reference numeral 21 represents an input line, and reference numeral 22 represents an output line.

In FIG. 1, while the switching device 12 is at on state, current flows through the input winding 231 and thus magnetic energy is accumulated in the transformer 23. Referring to FIG. 2, a current Ip flowing through the input winding 231 has a maximum value at a time point t1 immediately before the switching device 12 is turned off. When the switching device 12 is turned off at the time point t1 of FIG. 2, the junction capacitance of the switching device 12 or the distributed capacitance of the input winding 231 is charged with the current Ip of the input winding 231 and a voltage Vds between both ends, e.g., a drain and a source, of the switching device 12 is increased due to the magnetic energy accumulated in the transformer 23. When a voltage of the output winding 233 is higher than an output voltage, the diode 16 is turned on and thus the magnetic energy accumulated in the transformer 23 is supplied to the output winding 233. At a time point t2a, when the voltage Vds between the both ends of the switching device 12 becomes greater than or equal to a certain voltage, a forward voltage starts to be applied to the diode 18, and among magnetic energy accumulated in the transformer 23, high magnetic energy accumulated in the leakage inductance, which is not discharged via other windings and remained, forces the diode 18 to be conducted. In this timing, a large amount of high-frequency noise current is generated inside the diode 18. At a time point t2, when the voltage Vds between the both ends of switching device 12 is increased to a level sufficient to makes diode 18 to be conducted, the diode 18 is strongly turned on by the high energy accumulated in the leakage inductance and thus a current of the diode 18 increases while generating a large amount of high-frequency noise current. Accordingly, as shown in a waveform diagram of a diode current Id of FIG. 2C, the diode 18 generates a large amount of high-frequency noise current in a time period from the time point t2a to a time point t2b. A noise voltage is generated from the noise current and affects outside of a power supply device through an input line or through an output line via other windings of the transformer 23.

FIG. 3 illustrates an example of a structure of the transformer 23 included in the flyback converter of FIG. 1.

In FIG. 3, reference numerals 1 to 7 represent numbers allocated to pins of a transformer 23.

The input winding 231 and the output winding 233 are wound around a ferrite core 236 to have a tight magnetic coupling factor. A bias winding 232 is located between the input winding 231 and the output winding 233, and blocks capacitive coupling between input winding 231 and the output winding 233 generated by a switching operation of the switching device 12, thereby reducing a noise potential of a switching frequency component of the output line 22.

In the above-described power supply device of FIG. 1 according to the related art, a high high-frequency noise voltage is generated when a voltage of the switching device 12 is clamped and thus affects outside of the power supply device via the input line or the output line, thereby increasing costs of a line filter, etc.

FIG. 4 illustrates a power supply device according to the related art, in which energy accumulated in a leakage inductance of an input winding 231 of a transformer 23 is absorbed by a capacitor 51 and a resistor 52 to reduce a peak value of a spike voltage.

In FIG. 4, when the peak value of the spike voltage is reduced by absorbing the energy accumulated in the leakage inductance by the capacitor 51 and the resistor 52, an amount of energy to be applied to turn on the diode 18 may be reduced and thus the intensity of high-frequency noise generated by the diode 18 may be significantly reduced. However, since a high voltage is charged at both ends of the capacitor 51, expensive component that can endure high voltage is needed. Furthermore, when a switching device 12 is turned on, a large amount of power is lost as a voltage charged in the capacitor 51 is discharged via the switching device 12.

FIG. 5 is a circuit diagram of another example of a flyback converter according to the related art.

In FIG. 5, when a switching device 12 controlled by a control unit 13 is on, energy is accumulated in a first input winding 251 and a second input winding 252 of a transformer 25. When the switching device 12 is off, an output winding 253 outputs the energy. The output energy is rectified by a diode 16a and smoothened by a capacitor 17 to supply power to output. A flyback voltage generated by the second input winding 252 is rectified by a diode 14b and smoothened by a capacitor 15b and then is supplied as a power supply voltage to a control unit 13. However, after the switching device 12 is turned off, a spike voltage in which an electric potential changes at a high speed is generated from the energy accumulated in a leakage inductance component of the second input winding 252, which is not coupled to the output winding 253. The diode 14b generates a large high-frequency noise voltage when a flyback voltage having spike voltages in which an electric potential changes at a high speed is rectified. The noise voltage affects outside of a power supply device through the input line or through the output line via other windings of the transformer 23, thereby increasing costs of a noise filter for reducing a level of electromagnetic interference (EMI) of the power supply device to a predetermined value or less.

In FIG. 5, a resistor and a capacitor may be connected to both ends of the second input winding 252 to reduce a noise voltage generated by the second input winding 252 but it is difficult to significantly reduce the intensity of high-frequency noise generated by the diode 14b while maintaining a degree of power loss caused by the capacitor to be within a permissible level.

DISCLOSURE

Technical Problem

The related art is disadvantageous in that a large high-frequency noise voltage is generated by a diode of a clamp circuit or a diode rectifying auxiliary supply voltage to be radiated or conducted via a line and thus increases costs of a noise filter for reducing a level of electromagnetic interference (EMI) of a power supply device to a predetermined level or less, or in that power loss occurs when a level of EMI is reduced by a resistor-capacitor (RC) circuit or production costs increase due to use of components that can endure high voltage. The present invention is directed to solving such problems of the related art.

Technical Solution

The present invention is applicable to switching power supply devices but embodiments thereof will be described, for example, with respect to a flyback converter below.

To achieve the above-described purposes, a switching power supply device in which includes an input filter capacitor and a switching device comprises:
a transformer comprising a core of the transformer; a first input winding wound around the core of the transformer, connected between one terminal of the input filter capacitor and one terminal of the switching device, and a flow of current thereof is controlled by a switching operation of the switching device; and a second input winding wound around the core of the transformer, connected between another terminal of the input filter capacitor and another terminal of the switching device, a flow of current thereof is controlled by the switching operation of the switching device, and divided into a second main input winding part and a second attenuation winding part connected in series to each other;
a capacitive unit connected between both terminals of the second attenuation winding part of the transformer, and including at least one device including a first capacitor;
a control unit configured to drive the switching device; and
a rectification unit configured to supply a supply voltage to the control unit by rectifying and smoothing a flyback voltage generated by the second input winding.

In order to achieve the above-described purposes, a switching power supply device in which includes an input filter capacitor and a switching device comprises:
a transformer comprising a core of the transformer; and a first input winding wound around the core of the transformer, connected between one terminal of the input filter capacitor and one terminal of the switching device, a flow of current thereof is controlled by a switching operation of the switching device, and divided into a first main input winding part and a first attenuation winding part connected in series to each other;
a first capacitive unit connected between both terminals of the first attenuation winding part of the transformer, and including at least one device including a first capacitor; and
a clamp unit configured to limit a peak voltage generated by the first input winding when the switching device is turned off during the switching operation of the switching device, the clamp unit including a rectification diode.

In order to achieve the above-described purposes, a switching power supply device in which includes an input filter capacitor and a switching device comprises:
a transformer comprising a core of the transformer; and a first input winding wound around the core of the transformer, connected between one terminal of the input filter capacitor and one terminal of the switching device, a flow of current thereof is controlled by a switching operation of the switching device, and divided into a first main input winding part and a first attenuation winding part connected in series to each other;
a first capacitive unit connected between both terminals of the first attenuation winding part of the transformer, and including at least one device including a first capacitor;
a control unit configured to drive the switching device; and
a rectification unit configured to supply a supply voltage to the control unit by rectifying and smoothing a flyback voltage generated by the second input winding.

In addition, a product including the above-described power supply device according to the present invention is provided.

Advantageous Effects

The present invention is advantageous in that high-frequency noise generated by either a clamp diode for limiting a voltage generated by an input winding of a switching power supply or an auxiliary power supply diode for supplying power to a control unit controlling a switching device can be significantly reduced, thereby greatly reducing costs of an electromagnetic interference (EMI) filter of a power supply device.

DESCRIPTION OF DRAWINGS

FIG. 1 is a circuit diagram of a flyback converter according to the related art.

FIG. 2 is a waveform diagram of voltage and currents of components illustrated in FIG. 1.

FIG. 3 illustrates an example of a structure of a transformer included in the flyback converter of FIG. 1.

FIG. 4 is a circuit diagram of another example of a flyback converter according to the related art.

FIG. 5 is a circuit diagram of another example of a flyback converter according to the related art.

FIG. 6 is a circuit diagram of a flyback converter according to an embodiment of the present invention.

FIG. 7 illustrates an example of a structure of a transformer included in the flyback converter of FIG. 6.

FIG. 8 is a waveform diagram of voltage and current in FIG. 6.

FIG. 9 is a circuit diagram of a flyback converter according to another embodiment of the present invention.

FIG. 10 is a circuit diagram of a flyback converter according to still another embodiment of the present invention.

FIG. 11 illustrates an example of a structure of a transformer used in the flyback converter of FIG. 10.

FIG. 12 is a circuit diagram of a flyback converter according to still another embodiment of the present invention.

MODES OF THE INVENTION

Hereinafter, a method and apparatus for reducing noise generated by a diode located at a primary side of a switching power supply according to embodiments of the present invention will be described in more detail with reference to the accompanying drawings.

FIG. 6 illustrates an example of a flyback converter according to an embodiment of the present invention.

FIG. 6 illustrates an embodiment, in which a spike voltage generated from energy accumulated in a leakage inductance of a first input winding 261 of a transformer 26 is limited by a diode 18, a capacitor 19, and a resistor 20 and the intensity of high-frequency noise generated by the diode 18 is reduced.

In FIG. 6, the input winding 261 of the transformer 26 is divided into a main input winding part 261a and an attenuation winding part 261b. A capacitive unit 29 consisting of at least one element including a first capacitor 27 is connected between both terminals of the attenuation winding part 261b. When a switching device 12 is turned off, a spike voltage generated from energy accumulated in the leakage inductance of the input winding 261, which is not coupled to an output winding 263 is limited by the diode 18, the capacitor 19, and the resistor 20.

In FIG. 6, the attenuation winding part 261b induces energy accumulated in the main input winding part 261a. A leakage inductance of the attenuation winding part 261b, which is not coupled to the main input winding part 261a, resonates with the capacitor 27 and thus a current which gradually increases from 0 and then gradually reduces with time flows through the capacitor 27, immediately after the switching device 12 is turned off. When a voltage charged in the capacitor 27 is increased by a voltage induced by the attenuation winding part 261b, the charging of the capacitor 27 is stopped.

After the switching device 12 is turned off, the diode 18 is turned on when a junction capacitance of the switching device 12 and a distributed capacitance of the input winding 261 of the transformer 26 are charged to a level sufficient to makes the diode 18 turn on. However, when the diode 18 is turned on, an amount of energy to be used to turn on the diode 18 decreases by an amount of energy of the leakage inductance of the input winding 261 supplies current through the capacitor 27 via the attenuation winding part 261b. Accordingly, the intensity of high-frequency noise generated by the diode 18 is far less than that in the related art of FIG. 1.

In FIG. 6, reference numeral 14 represents a diode, reference numeral 15 represents a capacitor, reference numeral 21 represents an input line, reference numeral 22 represents an output line, reference numeral 28 represents a resistor, reference numeral 262 represents a second input winding, reference numeral 263 represents an output winding, and reference numeral 266 represents a core.

FIG. 7 illustrates an example of a structure of the transformer 26 included in the flyback converter of FIG. 6.

In FIG. 7, reference numerals 1 to 7 represent numbers allocated to pins of the transformer 26.

In FIG. 7, the main input winding part 261a is wound around a whole main winding layer of the transformer 26 to be well magnetically coupled to the output winding 263. The attenuation winding part 261b is wound to be coupled to a portion of the main input winding part 261a. A leakage inductance of the attenuation winding part 261b, which is not coupled to the main input winding part 261a, is high.

The high leakage inductance of the attenuation winding part 261b which is not coupled to the main input winding part 261a resonates with the capacitor 27 of FIG. 6 to limit a current to be charged in or discharged from the capacitor 27. Furthermore, electrostatic energy of the capacitor 27 is transferred in the form of magnetic energy to the high leakage inductance of the attenuation winding part 261b, which is not coupled to the main input winding part 261a, when the capacitor 27 of FIG. 6 is discharged, thereby preventing power loss caused by the discharging of the capacitor 27.

FIG. 8 is a waveform diagram of a voltage of the switching device 12 and a current flowing through the diode 18 illustrated in FIG. 7 when the switching device 12 is turned off.

In a time period between time points t2a' and t2b' immediately before and immediately after the diode 18 is turned on, the intensity of high-frequency noise current included in a waveform Id of current flowing through the diode 18 illustrated in FIG. 8 is far lower than that of high-frequency noise included in a waveform Id of current flowing through the diode 18 according to the related art illustrated in FIG. 2.

In the related art illustrated in FIG. 4, a voltage charged in the capacitor 51 is discharged when the switching device 12 is turned on and thus heavy power loss occurs in the resistor 52 or the switching device 12. In contrast, in FIG. 6, a voltage charged in the capacitor 27 is converted into magnetic energy and transferred to the transformer 26 as the amount of discharge current is limited due to resonance of the capacitor 27 and the high leakage inductance of the attenuation winding part 261b, which is not coupled to the main input winding part 261a, when the switching device 12 is turned on. Therefore, power loss does not occur unlike in FIG. 4.

FIG. 9 illustrates a flyback converter according to another embodiment of the present invention.

FIG. 9 illustrates high side switching, in which a switching device 12 is connected to a positive (+) side of an input voltage source. A flyback voltage of an input winding 301 of a transformer 30 is rectified and smoothened by a diode 18 and a capacitor 19 and thus a peak voltage generated by the input winding 301 is limited. The rectified voltage is applied as supply voltage to a control unit 13 via a resistor 20 and a capacitor 53. In FIG. 9, functions of a main input winding part 301a, an attenuation winding part 301b, and a capacitive unit 29 including a capacitor 27 correspond to those of the main input winding part 261a, the attenuation winding part 261b, and the capacitive unit 29 including the capacitor 27 illustrated in FIG. 6.

In FIG. 9, reference numeral 21 represents an input line, reference numeral 22 represents an output line, reference numeral 28 represents a resistor, reference numeral 301 represents a input winding, reference numeral 303 represents an output winding, reference numeral 306 represents a core, and reference numeral 53 represents a capacitor.

Although not shown, in FIGS. 6 and 9, a resistor may be added in series with the diode 18, or either a capacitor or both the capacitor and the resistor may be added between both terminals of the diode 18.

FIG. 10 is a diagram illustrating a structure of a power supply device capable of reducing the intensity of high-frequency noise generated by a rectification diode 14b configured to supply voltage to a control unit 13 controlling a switching device 12, according to an embodiment of the present invention.

In FIG. 10, an input winding of a transformer 31 is divided into a first input winding 311 connected between one terminal of an input filter capacitor 11 and one terminal of a switching device 12, and a second input winding 312 connected between another terminal of the input filter capacitor 11 and another terminal of the switching device 12. The second input winding 312 is divided into a second main input winding part 312a and a second attenuation winding part 312b connected in series to each other. A capacitive unit 34 including a capacitor 33 is connected between both terminals of the second attenuation winding part 312b.

In FIG. 10, when the switching device 12 is turned off, a flyback voltage of the second input winding 312, including a spike voltage generated from energy accumulated in a leakage inductance of the second input winding 312, is rectified and smoothened by the rectification diode 14b and a capacitor 15b and thus supplies voltage to a control unit 13. Although not shown, a resistor may be added in series with the rectification diode 14b, or either a capacitor or both the capacitor and the resistor may be added between both terminals of the rectification diode 14b.

In FIG. 10, immediately after the switching device 12 is turned off, the second attenuation winding part 312b induces energy accumulated in the second main input winding part 312a, and a current which gradually increases from 0 and then gradually reduces with time flows through the capacitor 33 due to resonance of the capacitor 33 and a leakage inductance of the second attenuation winding part 312b, which is not coupled to the second main input winding part 312a. When a voltage charged in the capacitor 33 is increased by the flyback voltage of the second attenuation winding part 312b, the charging of the capacitor 33 is stopped.

When a voltage of the second input winding 312 of the transformer 31 reaches a level sufficient to makes rectification diode 14b turn on, the rectification diode 14b is turned on. However, when the rectification diode 14b is turned on, an amount of energy to be used to turn on the rectification diode 14b decreases by an amount of energy of the leakage inductance of the second input winding 312 supplies current through the capacitor 33 via the second attenuation winding part 312b. Accordingly, the intensity of high-frequency noise generated by the rectification diode 14b is far less than that when the capacitive unit 34 including the capacitor 33 is not connected between the both terminals of the second attenuation winding part 312b and that in the related art of FIG. 5.

In FIG. 10, reference numeral 16a represents a rectifier, reference numeral 21 represents an input line, reference numeral 22 represents an output line, reference numeral 32 represents a resistor, reference numeral 313 represents an output winding, and reference numeral 316 represents a core.

FIG. 11 illustrates an example of a structure of a transformer used in the flyback converter of FIG. 10.

In FIG. 11, reference numerals 1 to 7 represent numbers allocated to pins of a transformer 31.

In FIG. 11, a first input winding 311 is wound around a whole winding layer of the transformer 31 to be well magnetically coupled to an output winding 313. A second attenuation winding part 312b is wound to be coupled to only portions of the first input winding 311 and a second main input winding part 312a. A leakage inductance of the second attenuation winding part 312b, which is not coupled to the first input winding 311 and the second main input winding part 312a, is high. The high leakage inductance of the second attenuation winding part 312b, which is not coupled to the first input winding 311 and the second main input winding part 312a, resonates with the capacitor 33 of FIG. 10 and thus a current to be charged in or discharged from the capacitor 33 is limited. When the capacitor 33 is discharged, electrostatic energy of the capacitor 33 is transferred in the form of magnetic energy and thus power loss caused by the discharging of the capacitor 33 may be prevented.

FIG. 12 illustrates an example of a structure of a power supply device capable of reducing not only high-frequency noise generated by a diode 18 which limits a spike voltage generated from energy accumulated in a leakage inductance of a first input winding 351 but also high-frequency noise generated by a rectification diode 14b which supplies supply voltage to a control unit 13 controlling a switching device 12, according to an embodiment.

In FIG. 12, an input winding of a transformer 35 is divided into a first input winding 351 connected between one terminal of an input filter capacitor 11 and one terminal of the switching device 12, and a second input winding 352 connected between another terminal of an input filter capacitor 11 and another terminal of the switching device 12. The first input winding 351 is divided into a first main input winding part 351a and a first attenuation winding part 351b connected in series to each other. A capacitive unit 29 including a capacitor 27 is connected between both terminals of the first attenuation winding part 351b. The second input winding 352 is divided into a second main input winding part 352a and a second attenuation winding part 352b connected in series to each other. A capacitive unit 34 including a capacitor 33 is connected between both terminals of the second attenuation winding part 352b.

In FIG. 12, when the switching device 12 is turned off, high-frequency noise generated by the diode 18 is significantly reduced by the capacitive unit 29 including the capacitor 27 connected between the both terminals of the first attenuation winding part 351b as described above with reference to FIG. 6. Furthermore, as described above with reference to FIG. 10, the high-frequency noise generated by the rectification diode 14b is significantly reduced by the capacitive unit 34 including the capacitor 33 connected between the both terminals of the second attenuation winding part 352b.

In FIG. 12, reference numeral 15b represents a capacitor, reference numeral 16a represents a rectifier, reference numeral 17 represents a capacitor, reference numeral 21 represents an input line, reference numeral 22 represents an output line, reference numeral 28 represents a resistor, reference numeral 353 represents an output winding, and reference numeral 356 represents a core.

As described above, in embodiments of the present invention, when the switching device 12 is turned off, current flows to the capacitive unit 29 including the capacitor 27 from the attenuation winding part 261b or 301b or the first attenuation winding part 351b and thus the intensity of noise generated by the diode 18 limiting a peak value of a voltage between both ends of the input winding 261 or 301 or the first input winding 351 may be significantly reduced.

In addition, in embodiments of the present invention, when the switching device 12 is turned off, current flows to the capacitive unit 34 including the capacitor 33 from the second attenuation winding part 312b or 352b and thus the amount of noise generated by the auxiliary power rectification diode 14b rectifying voltages of the second main input winding part 312a or 352a and the second attenuation winding part 312b or 352b may be significantly reduced. Accordingly, interference of noise generated from a power supply device to outside may be greatly reduced.

As described above, embodiments of the present invention are advantageous in that EMI of a power supply device can be reduced and filter costs can be reduced. Furthermore, an inexpensive capacitor that can endure low voltage can be used for the capacitor 27 of the capacitive unit 29, and power loss can be prevented.

While the technical idea of the present invention has been described above with reference to the accompanying drawings, the foregoing description is not intended to limit the scope of the present invention but is merely intended to provide most preferable embodiments of the invention as examples. It will be apparent that these embodiments can be implemented in various combinations, modified variously, or imitated by those of ordinary skill in the art without departing from the scope of the technical idea of the present invention.

The invention claimed is:

1. A switching power supply device which includes an input filter capacitor and a switching device, comprising:
   a transformer comprising a core of the transformer, an output winding configured to output energy and a first input winding, the first input winding being wound around the core of the transformer, connected between one terminal of the input filter capacitor and one terminal of the switching device, a flow of current thereof is controlled by a switching operation of the switching device, and divided into a first main input winding part and a first attenuation winding part connected in series to each other;
   a first capacitive unit connected between both terminals of the first attenuation winding part of the transformer, and including at least one device including a first capacitor; and
   a clamp unit configured to limit a peak voltage generated by the first input winding when the switching device is turned off during the switching operation of the switching device, the clamp unit including a rectification diode,
   wherein a resonance between a leakage inductance of the first attenuation winding part and the first capacitor decreases an amount of energy to be used to turn on the rectification diode to reduce the intensity of high-frequency noise generated by the rectification diode when the rectification diode is turned on.

2. The switching power supply device of claim 1, wherein another terminal of the switching device is connected to another terminal of the input filter capacitor.

3. The switching power supply device of claim 1, wherein the transformer further comprises a second input winding wound around the core of the transformer, connected between another terminal of the input filter capacitor and another terminal of the switching device, a flow of current thereof is controlled by the switching operation of the switching device, and divided into a second main input winding part and a second attenuation winding part connected in series to each other, and the switching power supply device further comprises:
   a second capacitive unit connected between both terminals of the second attenuation winding part of the transformer, and including at least one device including a second capacitor;
   a control unit configured to drive the switching device; and
   a rectification unit configured to supply a supply voltage to the control unit by rectifying and smoothing a voltage generated by the second input winding when the switching device is turned off during the switching operation of the switching device.

4. The switching power supply device of claim 1, wherein the transformer further comprises a second input winding wound around the core of the transformer, connected between another terminal of the input filter capacitor and another terminal of the switching device, and a flow of current thereof is controlled by the switching operation of the switching device.

5. A product comprising the switching power supply device of claim 1.

6. A switching power supply device which includes an input filter capacitor and a switching device, comprising:
   a transformer comprising a core of the transformer, an output winding configured to output energy and a first input winding, the first input winding being wound around the core of the transformer, connected between one terminal of the input filter capacitor and one terminal of the switching device, a flow of current thereof is controlled by a switching operation of the switching device, and divided into a first main input winding part and a first attenuation winding part connected in series to each other;
   a first capacitive unit connected between both terminals of the first attenuation winding part of the transformer, and including at least one device including a first capacitor;
   a control unit configured to drive the switching device; and
   a rectification unit configured to supply a supply voltage to the control unit by rectifying and smoothing a voltage generated by the first input winding when the switching device is turned off during the switching operation of the switching device, the rectification unit including a rectification diode,
   wherein a resonance between a leakage inductance of the first attenuation winding part and the first capacitor decreases an amount of energy to be used to turn on the rectification diode to reduce the intensity of high-frequency noise generated by the rectification diode when the rectification diode is turned on.

7. The switching power supply device of claim 6, wherein another terminal of the switching device is connected to another terminal of the input filter capacitor.

8. The switching power supply device of claim 6, wherein the transformer further comprises
   a second input winding wound around the core of the transformer, connected between another terminal of the input filter capacitor and another terminal of the switching device, a flow of current thereof is controlled by the switching operation of the switching device, and divided into a second main input winding part and a second attenuation winding part connected in series to each other, and the switching power supply device further comprises:

a second capacitive unit connected between both terminals of the second attenuation winding part of the transformer, and including at least one device including a second capacitor; and a clamp unit configured to limit a peak voltage generated by the second input winding when the switching device is turned off during the switching operation of the switching device, the clamp unit including a rectification diode.

9. The switching power supply device of claim 6, wherein the transformer further comprises a second input winding wound around the core of the transformer, connected between another terminal of the input filter capacitor and another terminal of the switching device, and a flow of current thereof is controlled by the switching operation of the switching device.

10. The switching power supply device of claim 6, wherein the transformer further comprises a second input winding wound around the core of the transformer, connected between another terminal of the input filter capacitor and another terminal of the switching device, and a flow of current thereof is controlled by the switching operation of the switching device, and the switching power supply device further comprises a clamp unit configured to limit a peak voltage generated by the second input winding when the switching device is turned off during the switching operation of the switching device, the clamp unit including a rectification diode.

11. A product comprising the switching power supply device of claim 6.

12. A switching power supply device which includes an input filter capacitor and a switching device, comprising:

a transformer comprising:

a core of the transformer;

a first input winding wound around the core of the transformer, connected between one terminal of the input filter capacitor and one terminal of the switching device, and a flow of current thereof is controlled by a switching operation of the switching device; and a second input winding wound around the core of the transformer, connected between another terminal of the input filter capacitor and another terminal of the switching device, a flow of current thereof is controlled by the switching operation of the switching device, and divided into a second main input winding part and a second attenuation winding part connected in series to each other;

a capacitive unit connected between both terminals of the second attenuation winding part of the transformer, and including at least one device including a first capacitor;

a control unit configured to drive the switching device; and a rectification unit configured to supply a supply voltage to the control unit by rectifying and smoothing a voltage generated by the second input winding when the switching device is turned off during the switching operation of the switching device.

13. The switching power supply device of claim 12, wherein the transformer further comprises an output winding wound around the core of the transformer and configured to output energy.

14. The switching power supply device of claim 12, further comprising a clamp unit configured to limit a peak voltage generated by the first input winding when the switching device is turned off during the switching operation of the switching device, and including a rectification diode.

15. A product comprising the switching power supply device of claim 12.

* * * * *